(12) United States Patent
Ando et al.

(10) Patent No.: US 9,371,932 B2
(45) Date of Patent: Jun. 21, 2016

(54) SOLENOID DEVICE

(71) Applicants: DENSO CORPORATION, Kariya, Aichi-pref. (JP); HAMANAKODENSO CO., LTD., Kosai, Shizuoka-pref. (JP)

(72) Inventors: Motoyoshi Ando, Nagoya (JP); Kengo Suzuki, Hamamatsu (JP); Takao Ishida, Toyohashi (JP)

(73) Assignees: DENSO CORPORATION, Kariya (JP); HAMANAKODENSO CO., LTD., Kosai (JP)

( * ) Notice: Subject to any disclaimer, the term of this patent is extended or adjusted under 35 U.S.C. 154(b) by 0 days.

(21) Appl. No.: 14/633,540

(22) Filed: Feb. 27, 2015

(65) Prior Publication Data

US 2015/0280541 A1 Oct. 1, 2015

(30) Foreign Application Priority Data

Mar. 28, 2014 (JP) ................................. 2014-70591

(51) Int. Cl.
*H02K 99/00* (2014.01)
*F16K 31/06* (2006.01)
*F16K 27/02* (2006.01)

(52) U.S. Cl.
CPC ........... *F16K 31/0637* (2013.01); *F16K 27/029* (2013.01); *F16K 27/0245* (2013.01); *F16K 27/0263* (2013.01)

(58) Field of Classification Search
CPC ............ F16K 31/0637; F16K 27/0245; F16K 27/0263; F16K 27/029
See application file for complete search history.

(56) References Cited

U.S. PATENT DOCUMENTS

| 5,516,424 A * | 5/1996 | Strohschein | B01D 29/23 137/544 |
| 6,019,120 A * | 2/2000 | Najmolhoda | F16K 31/0631 137/625.61 |
| 6,778,051 B2 * | 8/2004 | Shirase | B60T 8/363 251/129.01 |
| 6,860,293 B2 * | 3/2005 | Douglass | F16D 25/14 137/596.17 |
| 9,169,941 B2 * | 10/2015 | Lee | F16K 31/06 |
| 2014/0048732 A1 * | 2/2014 | Heyer | B60T 8/363 251/129.15 |
| 2015/0014560 A1 * | 1/2015 | Mayr | F16K 31/0634 251/129.15 |

FOREIGN PATENT DOCUMENTS

JP 4093092 3/2008

\* cited by examiner

*Primary Examiner* — Craig Schneider
*Assistant Examiner* — Kevin Barss
(74) *Attorney, Agent, or Firm* — Nixon & Vanderhye PC

(57) ABSTRACT

A solenoid device includes a plunger driven in an axial direction, a wall portion arranged to oppose the plunger in the axial direction, and a respiratory pore cover covering an opening of a respiratory pore of the wall portion. A volume variable chamber is defined between the plunger and the wall portion. The respiratory pore cover defines a communication space communicated to the respiratory pore, and an opening which causes the communication space to communicate with an exterior space. A volume of the communication space is larger than a predetermined volume of fluid that flows through the respiratory pore from or into the volume variable chamber by a predetermined movement of the plunger.

4 Claims, 6 Drawing Sheets

FIG. 1

FIRST SIDE ←——→ SECOND SIDE
AXIAL
DIRECTION

FIG. 2

FIRST SIDE ←——→ SECOND SIDE
AXIAL
DIRECTION

SOLENOID DEVICE

CROSS REFERENCE TO RELATED APPLICATION

This application is based on Japanese Patent Application No. 2014-70591 filed on Mar. 28, 2014, the disclosure of which is incorporated herein by reference in its entirety.

TECHNICAL FIELD

The present disclosure relates to a solenoid device.

BACKGROUND

An electromagnetic valve has a valve member driven by a solenoid device. JP 4093092 B describes an oil-pressure control valve used for an automatic shift as the electromagnetic valve. The solenoid device includes a plunger driven in an axial direction by magnetism, and an opposite wall arranged to oppose the plunger on one side in the axial direction. A volume variable chamber is defined between the plunger and the opposite wall. A volume of the volume variable chamber is changed by movement of the plunger. The opposite wall has a respiratory pore that causes the volume variable chamber to communicate with exterior space. When the plunger reciprocates in the axial direction, fluid flows out of the volume variable chamber through the respiratory pore and flows into the volume variable chamber through the respiratory pore as respiration.

However, a foreign object may be able to enter the solenoid device from the respiratory pore. If the solenoid device is used in oil as a part of oil-pressure control valve, a foreign object such as metal wear powder contained in oil may flow into the volume variable chamber by the respiration. If the metal wear powder adheres to the plunger, the plunger may not be able to properly slide and move.

SUMMARY

It is an object of the present disclosure to provide a solenoid device, in which a foreign object is restricted from entering the solenoid device.

According to an aspect of the present disclosure, a solenoid device includes a plunger driven in an axial direction, a wall portion and a respiratory pore cover. The wall portion is arranged to oppose the plunger in the axial direction. A volume variable chamber is defined between the plunger and the wall portion. A volume of the volume variable chamber is changed by movement of the plunger. The wall portion has a respiratory pore which causes the volume variable chamber to communicate with outside. The respiratory pore cover covers the respiratory pore from an outer side of the volume variable chamber. The respiratory pore cover defines a communication space communicated to the respiratory pore, and an opening which causes the communication space to communicate with an exterior space. A volume of the communication space is larger than a predetermined volume of fluid that flows through the respiratory pore from or into the volume variable chamber by a predetermined movement of the plunger.

The solenoid device includes the respiratory pore cover which covers the opening of the respiratory pore from the outer side of the volume variable chamber. The respiratory pore cover defines the communication space communicated to the respiratory pore and the opening through which the communication space and the exterior space are communicated to each other. The volume of the communication space communicated to the respiratory pore is larger than the predetermined volume of fluid which is moved by a respiration through the respiratory pore.

Accordingly, a foreign object becomes difficult to enter the solenoid device since the opening of the respiratory pore is covered with the respiratory pore cover. Moreover, since the volume of the communication space is larger than the predetermined volume of fluid which is moved by a respiration through the respiratory pore, the respiration caused by the movement of the plunger is completed in a manner that the fluid is moved between the communication space and the exterior space. Therefore, even if a foreign object enters the communication space in a suction process of the respiration, the foreign object can be discharged out of the communication space at the next respiration. For this reason, a foreign object is restricted from passing through the respiratory pore, and is restricted from entering the volume variable chamber.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(Embodiment)

Figure 1:
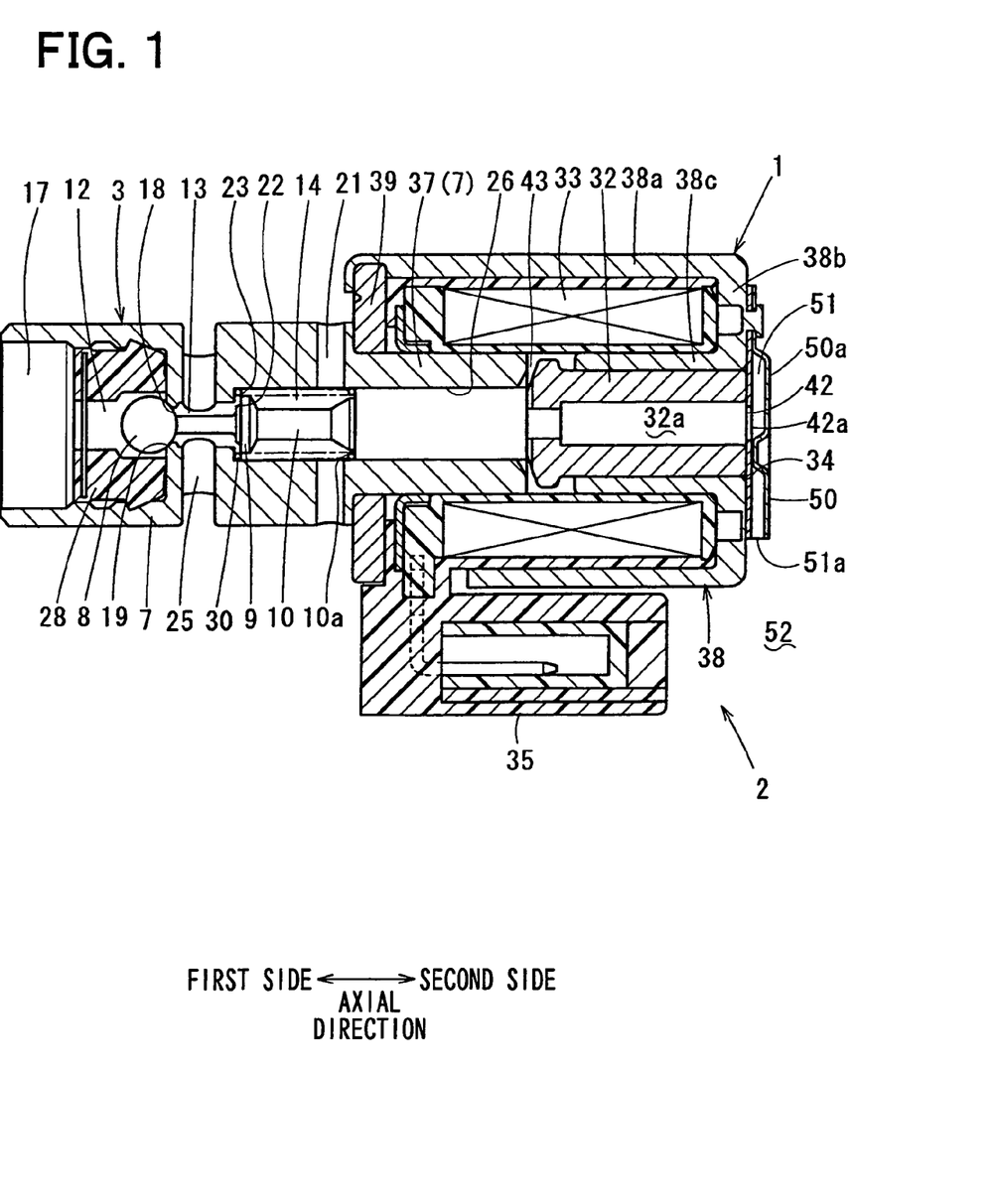
FIG. 1 is a sectional view illustrating an oil pressure control valve that includes a solenoid device according to an embodiment.

A solenoid device 1 according to an embodiment is explained with reference to the drawings. FIG. 1 is a cross-sectional view taken along a line I-I of FIG. 4. The solenoid device 1 of this embodiment is applied to an electromagnetic hydraulic control valve 2 of an automatic shift. The automatic shift has a hydraulic (oil pressure) controller that controls speed and that performs lock-up control. The hydraulic controller has the control valve 2 to perform hydraulic control.

The electromagnetic hydraulic control valve 2 is explained with reference to FIGS. 1-3. The control valve 2 includes a three-way valve 3 and the solenoid device 1 which drives the three-way valve 3. As shown in FIG. 3, the control valve 2 is used inside an oil pan 4. That is, the control valve 2 is used in the state where the control valve 2 is soaked in oil, in an oil storage space of the oil pan 4.

The three-way valve 3 includes a valve housing 7, a ball valve 8, a bleed valve 9, and a shaft 10. The shaft 10 is disposed in the valve housing 7, and is driven by the solenoid device 1 in the axial direction, such that the ball valve 8 and the bleed valve 9 are moved by the shaft 10, so as to switch the passages.

The valve housing 7 has an approximately pipe shape, and an input chamber 12, an output chamber 13, and a discharge chamber 14 are defined inside the valve housing 7 in this order toward the solenoid device 1 from a first side (left side in FIG. 1) to a second side (right side in FIG. 1) in the axial direction. The shaft 10 is disposed in the valve housing 7 so that the shaft 10 is able to move in the axial direction.

The input chamber 12 is a space having an input port 17 communicated to an input passage 16 (refer to FIG. 3) to which oil having a predetermined pressure is supplied, and a first opening 18 communicated to the output chamber 13. A first valve seat 19 is formed around the circumference of the first opening 18. The ball valve 8 is disposed in the input chamber 12, and opens and closes the first opening 18 by being seated on or separated from the first valve seat 19.

The discharge chamber 14 is a space having a discharge port 21 communicated to the oil storage space of the oil pan 4 so as to discharge oil, and a second opening 22 communicated to the output chamber 13. A second valve seat 23 is formed around the circumference of the second opening 22. The bleed valve 9 is disposed in the discharge chamber 14, and opens and closes the second opening 22 by being seated on or separated from the second valve seat 23.

The output chamber 13 is defined between the input chamber 12 and the discharge chamber 14, and has an output port 25 communicated to an output passage 24 (refer to FIG. 3) through which oil is output to an oil passage of an object to be controlled. The output chamber 13 is communicated to or disconnected from the input chamber 12 by the ball valve 8 that opens and closes the first opening 18. The output chamber 13 is communicated to or disconnected from the discharge chamber 14 by the bleed valve 9 that opens and closes the second opening 22.

The first opening 18 and the second opening 22 are formed on the axis line of the shaft 10, and the shaft 10 is arranged to pass through the first opening 18 and the second opening 22. The valve housing 7 further has a slide hole 26 in which the shaft 10 slidingly moves. The slide hole 26 is continuously formed from the discharge chamber 14 toward the second side in the axial direction, and is defined by the inside of the pipe. A portion of the valve housing 7 defining the slide hole 26 corresponds to a part of a fixed magnetism circuit of the solenoid device 1.

The ball valve 8 is made of metal and has a sphere shape. The ball valve 8 is arranged in the input chamber 12 and moves toward the first side in the axial direction to separate from the valve seat when the tip end of the shaft 10 presses the ball valve 8. The ball valve 8 is held inside a ball holder 28 that is fixed to the inner side of the input port 17. When the tip end of the shaft 10 does not press the ball valve 8, the ball holder 28 holds the ball valve 8 in a range where the ball valve 8 is certainly seated on the first valve seat 19 by the oil pressure supplied from the input port 17. The ball holder 28 has an opening not to close a space between the input port 17 and the first opening 18.

The bleed valve 9 has a flange shape integrally formed with the shaft 10, and is located in the discharge chamber 14. The bleed valve 9 is seated on the second valve seat 23 by the driving force of the solenoid device 1.

The shaft 10 is made of nonmagnetic metal and has an approximately stick shape. The shaft 10 is supported in the slide hole 26 to be slidable in the axial direction. A space is defined between the inner circumference surface of the valve housing 7 that defines the discharge chamber 14 and a part of the shaft 10 on the second side from the bleed valve 9 in the axial direction, and a spring 30 is arranged in the space.

The spring 30 has a first end that is supported by a projection defined in the discharge chamber 14 (located on the outer side of the second valve seat 23) and a second end that is supported by a projection part 10a of the shaft 10, such that the shaft 10 is biased toward the second side in the axial direction.

The shaft 10 is always in contact with a plunger 32 of the solenoid device 1. In other words, the spring 30 is also a component which biases the plunger 32 toward the second side in the axial direction.

The solenoid device 1 includes a coil 33, the plunger 32, the fixed magnetism circuit, a plate 34, and a connector 35. The plate 34 may correspond to a wall portion.

When electricity is supplied to the coil 33, the coil 33 generates magnetic force, and a magnetic flux loop is formed to pass through the plunger 32 and the fixed magnetism circuit. The coil 33 has a bobbin made of plastic material and many conductive leads such as enameled wires covered with insulation material wound around the bobbin.

The plunger 32 is supported on the inner side of the coil 33 and is slidable in the axial direction (left-and-right direction in the sectional view). The spring 30 biases the plunger 32 toward the second side (rightward) in the axial direction. The magnetic force generated by the coil 33 drives the plunger 32 toward the first side (leftward) in the axial direction.

The fixed magnetism circuit has a stator 37 and a yoke 38. The stator 37 is disposed to oppose the plunger 32 in the axial direction and is located on the first side of the plunger 32 in the axial direction. The yoke 38 is connected to the stator 37, and surrounds the coil 33. The stator 37 and the yoke 38 are made of magnetic metal (for example, ferromagnetic material such as iron).

In addition, a part of the valve housing 7 functions as the stator 37. That is, a portion of the valve housing 7 that defines the slide hole 26 is inserted into the coil 33, and is located to oppose the plunger 32 such that a part of the magnetic circuit is formed.

The yoke 38 has an outer circumference yoke 38a, an end yoke 38b, and an inner circumference yoke 38c. The outer circumference yoke 38a has a cylindrical shape and covers the perimeter of the coil 33. The end yoke 38b has a ring shape extending inward in the radial direction from the second-side axial end of the outer circumference yoke 38a. The inner circumference yoke 38c extends from the radially inner end of the end yoke 38b toward the first side in the axial direction, and is arranged on the inner side of the coil 33. The plunger 32 slidingly moves inside the inner circumference yoke 38c. A magnetic plate 39 is interposed between the first-side axial end portion of the outer circumference yoke 38a and the stator 37.

The plate 34 has a disk shape, and regulates the plunger 32 from moving rightward (toward the second side in the axial direction). The plate 34 is fixed on the second-side axial end surface of the end yoke 38b. That is, the plate 34 closes the opening of the inner circumference yoke 38c, and is fixed to oppose the second-side axial end of the plunger 32.

Figure 2:
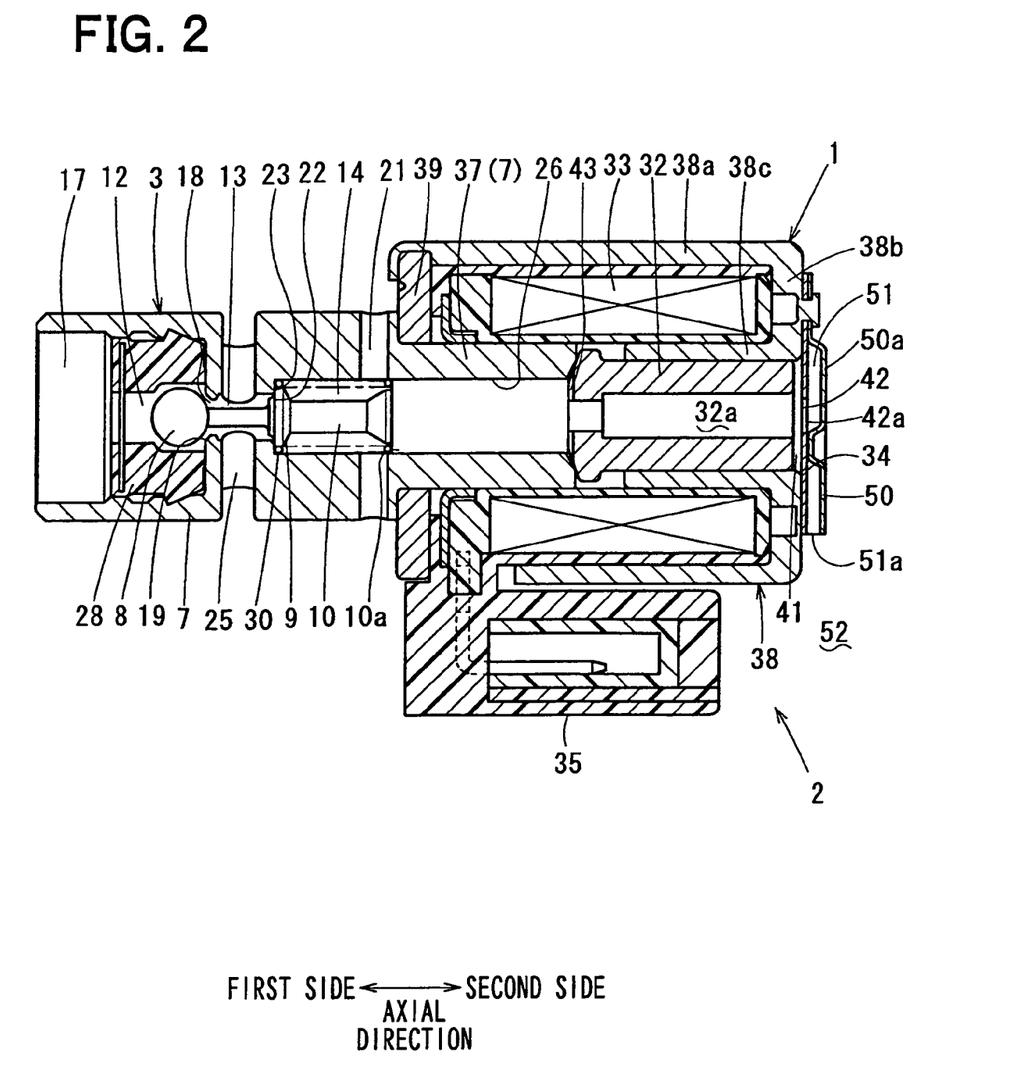
FIG. 2 is a sectional view illustrating the oil pressure control valve in which a volume variable chamber is defined in the solenoid device.
Figure 3:
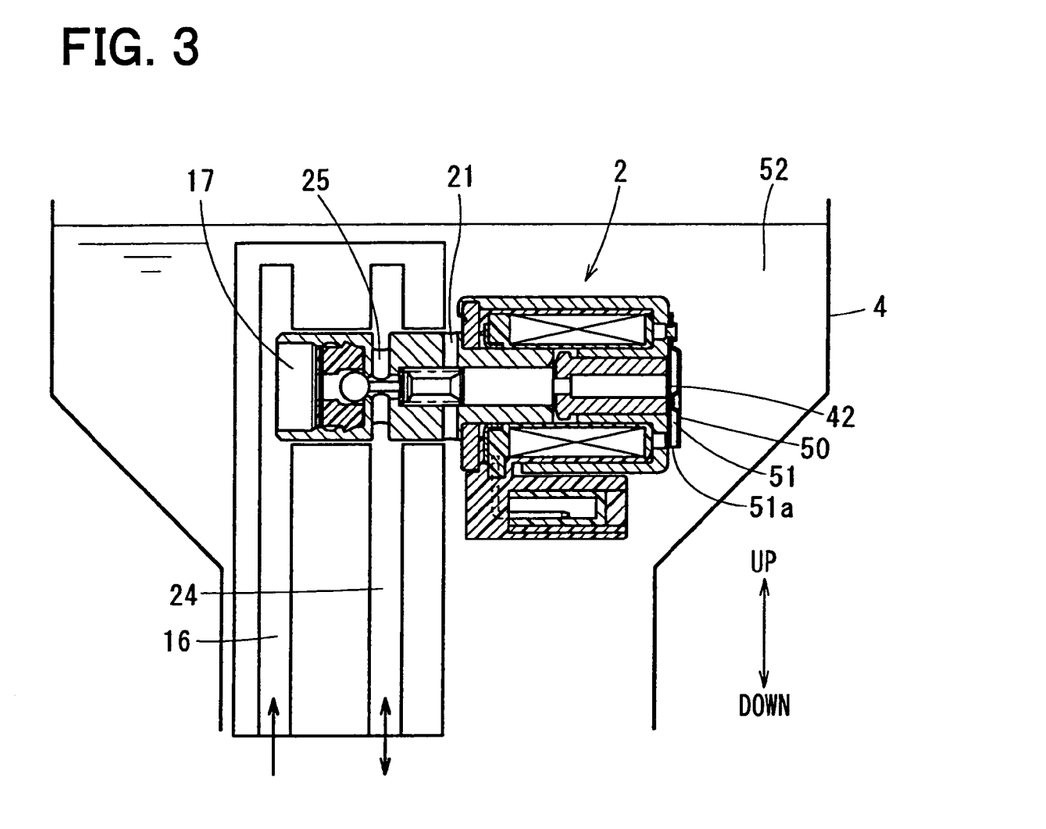
FIG. 3 is a view illustrating the oil pressure control device placed in an oil pan.

As shown in FIG. 2, a volume variable chamber 41 is defined between the plunger 32 and the plate 34, and the volume of the volume variable chamber 41 is changed by the movement of the plunger 32. The plate 34 has a respiratory pore 42 that passes through the central part of the plate 34 in the axial direction, and the volume variable chamber 41 is able to communicate with outside through the respiratory pore 42.

When the plunger 32 reciprocates in the axial direction, oil (fluid) flows into and flows out of the volume variable chamber 41 through the respiratory pore 42 as a respiration (breathing) to be explained in detail below. Since the control valve 2 is used in the oil pan 4, the volume variable chamber 41 is filled with oil.

Operation of the control valve 2 is described. As shown in FIG. 1, when the solenoid device 1 is OFF in which electricity is not supplied to the coil 33, the plunger 32 is biased by the spring 30 toward the second side in the axial direction. At this time, the ball valve 8 is seated on the first valve seat 19, and the bleed valve 9 is separated from the second valve seat 23. For this reason, the output port 25 and the discharge port 21 communicate with each other, and the input port 17 and the output port 25 are disconnected from each other.

When it is required to raise the pressure of the output oil, the energization of the coil 33 is started to turn on the solenoid device 1. Thereby, as shown in FIG. 2, the shaft 10 is moved toward the first side in the axial direction with the plunger 32, and the ball valve 8 is pressurized on the first side in the axial direction. Therefore, the ball valve 8 is separated from the first valve seat 19, and the bleed valve 9 is seated on the second valve seat 23. For this reason, the input port 17 and the output port 25 communicate with each other, and the output port 25 and the discharge port 21 are disconnected from each other.

A respiration generated by the movement of the plunger 32 is described. When the solenoid device 1 is shifted to the ON state shown in FIG. 2 from the OFF state shown in FIG. 1, the plunger 32 moves away from the plate 34, during which oil of a predetermined volume is drawn through the respiratory pore 42 into the volume variable chamber 41 in a suction process.

When the solenoid device is shifted to the OFF state shown in FIG. 1 from the ON state shown in FIG. 2, the plunger 32 approaches the plates 34, during which oil of a predetermined volume is discharged out of the volume variable chamber 41 through the respiratory pore 42 in a discharge process.

In this embodiment, the volume variable chamber 41 is communicated also to a space 43 defined on the first side of the plunger 32 in the axial direction through a hole 32a defined to extend inside the plunger 32 in the axial direction. For this reason, in the suction process, oil may flow into the space 43 from the volume variable chamber 41 through the hole 32a. Moreover, in the discharge process, oil may flow out of the space 43 into the volume variable chamber 41 through the hole 32a.

The solenoid device 1 further has a respiratory pore cover 50 which covers an opening 42a of the respiratory pore 42 from the outer side of the volume variable chamber 41. The respiratory pore cover 50 defines a communication space 51 communicated to the respiratory pore 42, and an opening 51a through which the communication space 51 and an exterior space 52 communicate with each other. The exterior space 52 corresponds to the oil storage space in the oil pan 4. The plunger 32 is arranged on the first side of the plate 34 in the axial direction to define the volume variable chamber 41 between the plunger 32 and the plate 34, and the respiratory pore cover 50 is arranged on the second side, that is opposite from the first side, of the plate 34 in the axial direction.

Figure 5:
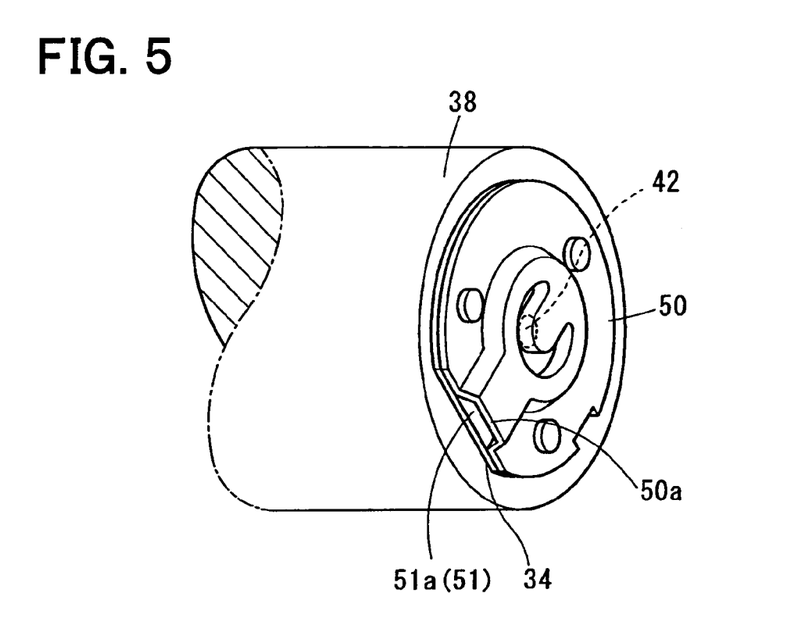
FIG. 5 is a perspective view illustrating the solenoid device.

The respiratory pore cover 50 is located on the second side of the plate 34 in the axial direction, and the communication space 51 is defined between the plate 34 and the respiratory pore cover 50. Specifically, the respiratory pore cover 50 is made of metal plate, and has a projection part 50a projected from a surface in contact with the plate 34. The projection part 50a is formed by pressing. The communication space 51 is defined between the projection part 50a and the plate 34 (refer to FIG. 5). The plate 34 and the respiratory pore cover 50 overlap with each other in the axial direction. In this state, the plate 34 and the respiratory pore cover 50 are fixed to a fix portion of the end yoke 38b by plastically deforming.

The volume of the communication space 51 is larger than the predetermined volume of oil which is moved by respiration through the respiratory pore 42. That is, the volume of the communication space 51 is larger than the predetermined volume of oil which passes through the respiratory pore 42 in the suction process or the discharge process.

Figure 4:
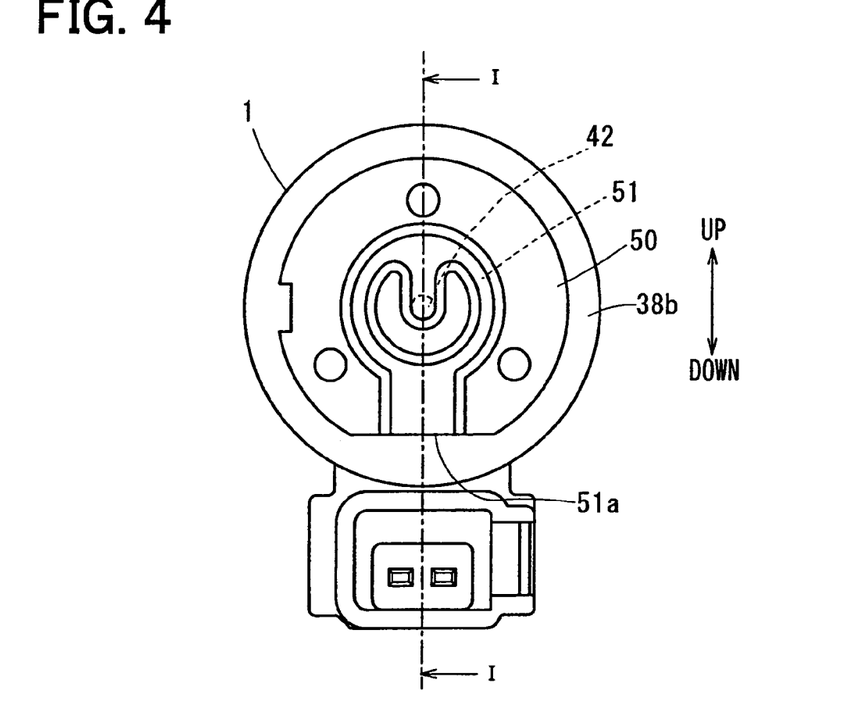
FIG. 4 is a side view illustrating the oil pressure control valve seen from one side in an axial direction of a plunger of the solenoid device.

As shown in FIG. 3 and FIG. 4, the opening 51a of the communication space 51 communicated to the exterior space 52 is opened downward in the gravity direction.

Figure 6:
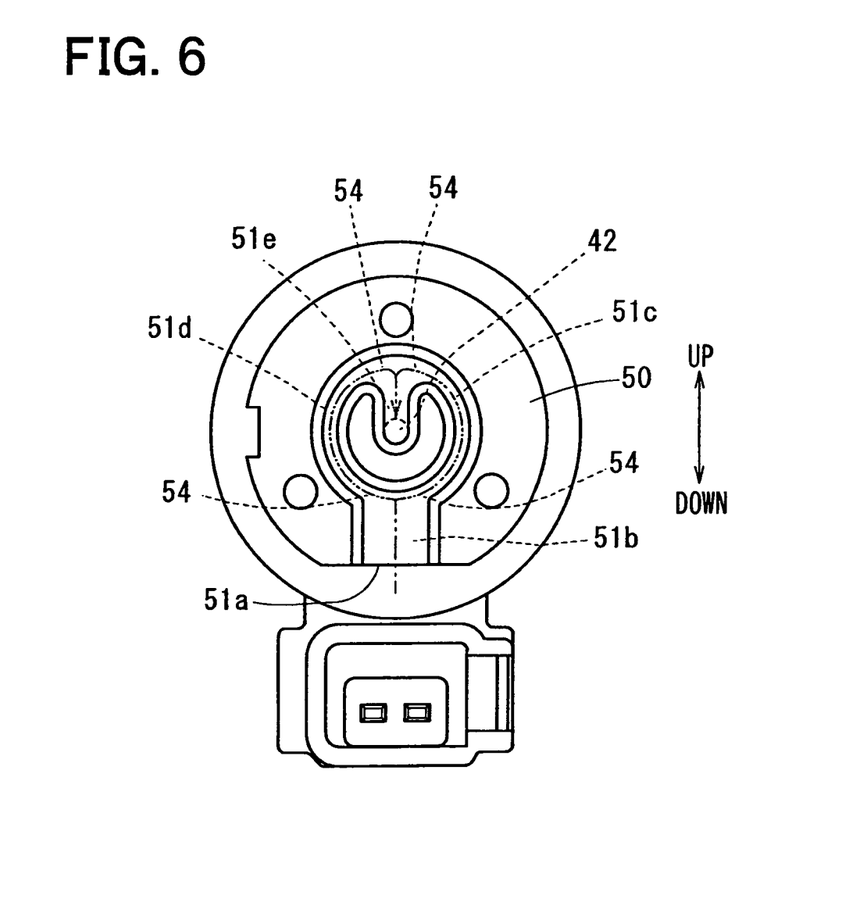
FIG. 6 is a view explaining a labyrinth structure of a communication space defined by a respiratory pore cover and a plate of the solenoid device.

As shown in FIG. 6, the communication space 51 has a bent part 54 in a passage extending from the opening 51a to the respiratory pore 42, so as to define the shape of a labyrinth. That is, the communication space 51 is formed in the shape of a labyrinth not linearly extending to the respiratory pore 42 from the opening 51a.

Specifically, as shown in FIG. 6, the communication space 51 has a first passage 51b, a second passage 51c, a third passage 51d, and a fourth passage 51e in a side view seen from the axial direction.

The first passage 51 b is a passage extending upward from the opening 51a in the gravity direction.

The second passage 51c and the third passage 51d are passages branched from the first passage 51b on the different sides in the circumferential direction. The second passage 51c and the third passage 51d are defined to have arc-shape on the radially outer side of the respiratory pore 42 not to overlap with the respiratory pore 42. The second passage 51c and the third passage 51d join with each other at a position separated from the first passage 51b by 180 degrees. The second passage 51c and the third passage 51d have the shape of concentric circle having common axis as the respiratory pore 42, and define a passage having the shape of a ring which encloses the circumference of the respiratory pore 42 in the plan view.

The fourth passage 51e is a passage extending downward in the gravity direction from the join part at which the second passage 51c and the third passage 51d join with each other so as to be communicated to the respiratory pore 42.

The bent part 54 is formed at the branch part at which the second passage 51c and the third passage 51d are branched from the first passage 51b, and at the branch part at which the second passage 51c and the third passage 51d join to the fourth passage 51e, such that the labyrinth shape can be formed.

The respiratory pore cover 50 is made of magnetic material. The plate 34 is made of nonmagnetic material.

According to the embodiment, the solenoid device 1 includes the respiratory pore cover 50 covering the opening 42a of the respiratory pore 42 from the outer side of the volume variable chamber 41. The respiratory pore cover 50 defines the communication space 51 communicated to the respiratory pore 42 and the opening 51a through which the communication space 51 and the exterior space 52 are communicated with each other. Thereby, the volume variable chamber 41 can be restricted from drawing a foreign object through the respiratory pore 42.

In case where a foreign object such as metal wear powder is contained in oil of the oil storage space (exterior space 52) in the oil pan 4, a solenoid device of a comparison example not having the respiratory pore cover 50 may draw the metal wear powder into the solenoid device of the comparison example from the respiratory pore 42 in the suction process.

In this embodiment, since the opening 42a of the respiratory pore 42 is covered with the respiratory pore cover 50, the foreign object is restricted from being drawn into the volume variable chamber 41 through the respiratory pore 42.

Moreover, since the volume of the communication space 51 is larger than the predetermined volume of oil moved by the respiration through the respiratory pore 42, the respiration caused the movement of the plunger is completed such that oil goes back and forth between the communication space 51 and the exterior space 52.

In the suction process in which the plunger 32 is moved to the first side in the axial direction such that the volume variable chamber 41 is enlarged, oil is drawn into the volume variable chamber 41 through the respiratory pore 42 from the communication space 51. However, because the volume of the communication space 51 is larger than the predetermined volume of oil moved by the respiration through the respiratory pore 42, only the oil in the communication space 51 is drawn into the volume variable chamber 41, and oil flowing from the exterior space 52 is drawn into the communication space 51 and not drawn into the volume variable chamber 41.

In the discharge process in which the plunger 32 is moved to the second side in the axial direction such that the volume of the volume variable chamber 41 is reduced, oil is discharged out of the volume variable chamber 41 through the respiratory pore 42. At this time, the oil discharged from the volume variable chamber 41 remains in the communication space 51 and is not discharged out of the communication space 51. In other words, oil in the communication space 51 is discharged to the exterior space 52.

Thus, only the communication space 51 receives oil flowing from the exterior space 52 when a respiration is performed, and the volume variable chamber 41 does not receive oil flowing from the exterior space 52 when a respiration is performed. If a foreign object is drawn into the communication space 51 in the suction process, the foreign object can be discharged out of the communication space 51 in the discharge process. For this reason, compared with a case where oil is drawn from the exterior space 52 into the volume variable chamber 41 through the respiratory pore 42 without the communication space 51, the foreign object is restricted from being drawn into the volume variable chamber 41 through the respiratory pore 42.

According to the embodiment, the opening 51a of the communication space 51 communicated to the exterior space 52 is opened downward in the gravity direction. Therefore, the foreign object can be restricted from being drawn into the communication space 51, because the metal wear powder which is a main component of the foreign object goes downward in the gravity direction in the oil pan 4.

The communication space 51 has the bent part 54 in the passage extending from the opening 51a to the respiratory pore 42, so as to define the shape of a labyrinth. Therefore, as shown in FIG. 6, even if a foreign object is drawn into the space 50, the foreign object cannot easily reach the respiratory pore 42, due to the labyrinth shape. For example, in this embodiment, since a foreign object goes through the first passage 51b straightly due to inertia, it is difficult for the foreign object to enter the second passage 51c and the third passage 51d. Therefore, the foreign object is restricted from being drawn into the volume variable chamber 41 through the respiratory pore 42.

Figure 7:
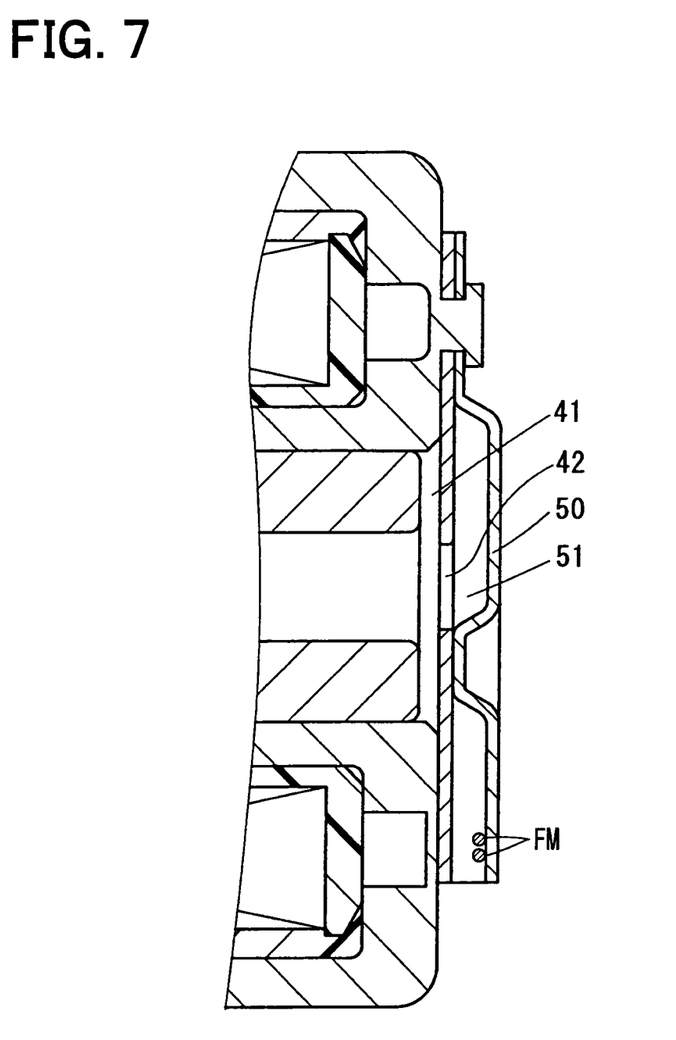
FIG. 7 is an enlarged sectional view of the solenoid device.

The respiratory pore cover 50 is made of magnetic material. According to this, as shown in FIG. 7, even if a foreign object FM is temporarily drawn into the space 50, the inner wall surface of the respiratory pore cover 50 adsorbs the foreign object FM mainly made of metal wear powder, due to the influence of the magnetic circuit formed by the plunger 32 and the fixed magnetism circuit. For this reason, the volume variable chamber 41 can be prevented from drawing the foreign object through the respiratory pore 42. That is, the foreign object is restricted from being drawn into the volume variable chamber 41 through the respiratory pore 42.

(Modification)

In the embodiment, the communication space 51 has the shape of a labyrinth. As a modification of the embodiment, the communication space 51 may not have the shape of a labyrinth. Moreover, the respiratory pore cover 50 may be made of a nonmagnetic material. Moreover, the opening 51a may not be opened downward in the gravity direction.

In the embodiment, the volume variable chamber 41 is communicated also to the space 43 on the first side of the plunger 32 in the axial direction through the hole 32a of the plunger 32. As a modification of the embodiment, the hole 32a may not be formed in the plunger 32, not to be communicated to the space 43.

In the embodiment, the present disclosure is applied to the solenoid device 1 for the control valve 2 used for hydraulically controlling an automatic shift. As a modification of the embodiment, the present disclosure may be applied to an electrohydrostatic control valve which controls oil pressure and oil flow rate for an apparatus other than the automatic shift.

In the embodiment, the solenoid device 1 is used in oil, so fluid flowing through the respiratory pore in and out is oil. As a modification of the embodiment, the fluid may be liquid different from oil or may be gas.

Such changes and modifications are to be understood as being within the scope of the present disclosure as defined by the appended claims.

What is claimed is:

1. A solenoid device comprising:
a plunger driven in an axial direction;
a wall portion arranged to oppose the plunger in the axial direction, wherein a volume variable chamber is defined between the plunger and the wall portion, a volume of the volume variable chamber being changed by movement of the plunger, the wall portion having a respiratory pore which causes the volume variable chamber to communicate with outside; and
a respiratory pore cover covering the respiratory pore from an outer side of the volume variable chamber, wherein
the respiratory pore cover defines
a communication space communicated to the respiratory pore, and
an opening which causes the communication space to communicate with an exterior space, and
a volume of the communication space is larger than a predetermined volume of fluid that flows through the respiratory pore from or into the volume variable chamber by a predetermined movement of the plunger.

2. The solenoid device according to claim 1, wherein
the opening is defined between the exterior space and the communication space, and
the opening is opened downward in a gravity direction.

3. The solenoid device according to claim 1, wherein the communication space has a bent part in a passage extending from the opening to the respiratory pore, so as to define a labyrinth shape.
4. The solenoid device according to claim 1, wherein the respiratory pore cover is made of magnetic material.

* * * * *